United States Patent
Holsman et al.

(10) Patent No.: US 10,650,074 B1
(45) Date of Patent: *May 12, 2020

(54) SYSTEMS AND METHODS FOR IDENTIFYING AND MANAGING TOPICAL CONTENT FOR WEBSITES

(71) Applicant: Oath Inc., Dulles, VA (US)

(72) Inventors: Ian Holsman, Richmond (AU); Sultana Darya, Aldie, VA (US)

(73) Assignee: Oath Inc., Dulles, VA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/327,473

(22) Filed: Jul. 9, 2014

Related U.S. Application Data

(63) Continuation of application No. 13/205,172, filed on Aug. 8, 2011, now Pat. No. 8,819,022.

(51) Int. Cl.
*G06F 16/24* (2019.01)
*G06F 16/958* (2019.01)
*H04L 29/08* (2006.01)

(52) U.S. Cl.
CPC .......... *G06F 16/958* (2019.01); *H04L 67/10* (2013.01)

(58) Field of Classification Search
CPC ........ G06F 17/30089; G06F 16/24578; G06F 16/248; G06F 16/90335; G06F 16/219; G06F 16/23; G06F 16/2322
See application file for complete search history.

(56) References Cited

U.S. PATENT DOCUMENTS

| | | | | |
|---|---|---|---|---|
| 8,145,623 B1* | 3/2012 | Mehta | ................. | G06F 17/3064 707/713 |
| 8,645,384 B1* | 2/2014 | Juang | ................. | G06F 17/30722 707/738 |
| 8,762,326 B1* | 6/2014 | Zhou | ................. | G06F 17/30864 707/609 |
| 8,874,555 B1* | 10/2014 | Kim | .............................. | 707/723 |
| 2003/0033333 A1 | 2/2003 | Nishino et al. | | |
| 2008/0255935 A1 | 10/2008 | Madhavan et al. | | |
| 2009/0019153 A1* | 1/2009 | Sebastian | .......... | G06F 17/30902 709/224 |
| 2009/0182725 A1* | 7/2009 | Govani | ............. | G06F 17/30864 |
| 2010/0228712 A1 | 9/2010 | Wexler et al. | | |
| 2010/0318484 A1* | 12/2010 | Huberman | .............. | G06Q 30/02 706/46 |

(Continued)

OTHER PUBLICATIONS

Yin et al. "Geographical Topic Discovery and Comparison", ACM, Mar. 28-Apr. 1, 2011.*

*Primary Examiner* — Apu M Mofiz
*Assistant Examiner* — Cindy Nguyen
(74) *Attorney, Agent, or Firm* — Bookoff McAndrews, PLLC

(57) ABSTRACT

Systems and methods are disclosed for identifying and managing topical content for websites. In accordance with one implementation, a method is provided for identifying and managing topical content for a website. The method may include determining a set of topics at a first level of popularity, determining a set of topics at a second level of popularity, and discounting the set of topics at the second level of popularity based on the set of topics at the first level of popularity to determine a revised set of topics for the second level of popularity. The method may also include managing the topical content based on the revised set of topics for the second level of popularity.

21 Claims, 8 Drawing Sheets

(56) References Cited

U.S. PATENT DOCUMENTS

| | | | |
|---|---|---|---|
| 2011/0015990 A1* | 1/2011 | Sanghavi | G06Q 10/087 |
| | | | 705/14.43 |
| 2011/0213655 A1* | 9/2011 | Henkin | G06Q 30/00 |
| | | | 705/14.49 |
| 2011/0218946 A1 | 9/2011 | Stern et al. | |
| 2011/0276581 A1 | 11/2011 | Zelevinsky | |

* cited by examiner

500-A

LOCAL — 501-A

Farm Grants
Emma Thompson — 502-A
Local Factory

Farm Grants — 501-B

Town Hall Meeting to Discuss Farm Grants
President to Increase Number of Farm Grants — 502-B
The Importance of the US Farmer

```
<SITE>
    <ELEMENT-1></ELEMENT-1>
    <ELEMENT-2>
        <SUB-ELEMENT></SUB-ELEMENT>
    </ELEMENT-2>
</SITE>
```

FIG. 5E

SYSTEMS AND METHODS FOR IDENTIFYING AND MANAGING TOPICAL CONTENT FOR WEBSITES

This is a continuation of U.S. patent application Ser. No. 13/205,172, filed on Aug. 8, 2011 (now allowed), which is expressly incorporated herein by reference in its entirety.

BACKGROUND

Technical Field

The present disclosure relates generally to systems and methods for identifying topics and managing content, such as content for a website. More specifically, and without limitation, the present disclosure relates to systems and methods for identifying topical content and managing the content for presentation on one or more websites.

Background Information

Currently, newspapers, magazines, and other publishers of timely textual and visual content are increasingly competing with online websites for the public's attention. Online websites that generate content (so-called "content sites") often employ writers or bloggers to generate articles, podcasts, videos, and other content regarding topics that are popular at the moment. This concept is sometimes referred to as trending. These content sites face challenges in generating the quantity and diversity of content desired by the public, while keeping a website's navigational structure topical, which is necessary to obtain sufficient web traffic and associated advertising revenue.

Some types of online content can have a low shelf-life, in that it can be rendered out-of-date by, for example, current events or new conventional wisdom. In addition, online content faces tremendous levels of competition. As a result of the fierce competition for online content, it is important for providers of online content to generate very large volumes of content and manage the content to keep their website(s) fresh. It can be useful to continuously generate large amounts of content about a topic to ensure that it is timely and up-to-date, as well to ensure that such content is distributed and displayed throughout the Internet, where it is likely to be consumed by online users. But, it is also important that the navigational structure of a website can rapidly change to accommodate shifts in the popularity of topics, so the website can stay fresh and so that the rapidly generated content can be presented to the user in a topical, organized manner.

In view of the foregoing, there is a need for improved systems and methods for identifying and managing topical content for websites. There is also a need for improved systems and methods that automatically manage the presentation of topical content, including by organizing and/or updating the navigational structure of a website.

SUMMARY

One aspect of the disclosure relates to a computer-implemented method for identifying and managing topical content for a website. The method may comprise determining a set of topics at a first level of popularity. The method may further comprise determining a set of topics at a second level of popularity. The method may further comprise discounting the set of topics at the second level of popularity based on the set of topics at the first level of popularity to determine a revised set of topics for the second level of popularity. The method may also comprise managing the topical content based on the revised set of topics for the second level of popularity.

Another aspect of the disclosure relates to a device for identifying and managing topical content of a website. The device may comprise at least one processor; and a storage device storing a set of instructions, that when executed by the at least one processor, perform a method. The method may comprise one or more of determining a set of topics at a first level of popularity; determining a set of topics at a second level of popularity; discounting the set of topics at the second level of popularity based on the set of topics at the first level of popularity to determine a revised set of topics for the second level of popularity; and managing topical content based on at least the revised set of topics for the second level of popularity.

Consistent with another aspect of the disclosure, the method or device may be used to update a navigational structure of a website based on the determined popularities.

Additional aspects of the present disclosure relate to computer-implemented systems and computer-implemented media for automatically organizing a navigational structure, as further described herein.

Before explaining exemplary embodiments of the present disclosure, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The following figures are used to describe exemplary features and embodiments related to the present disclosure. In the figures:

FIG. 5A depicts an exemplary topic area, consistent with an embodiment of the present disclosure;

FIG. 5B depicts an exemplary topic area, consistent with an embodiment of the present disclosure;

FIG. 5E depicts an exemplary structure of a website, consistent with an embodiment of the present disclosure.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Embodiments of the present disclosure relate to identifying and managing topical content for a website, including online electronic content generated by users, which is often referred to as "user-generated content" ("UGC"). Topical content may generally include any type or combination of text, images, audio, video, or computer programs. For example, topical content may include articles, blog posts, photos, recordings, videos, music, audio tracks, software, and/or games created by anyone in the world. In one embodiment, it may be desirable for users to submit topical content to a network where it may be analyzed, manipulated, and/or distributed throughout the Internet. Although referred to interchangeably as "topical content," "electronic data," "online content," or "UGC," such content may or may not be associated with the Internet. For example, content may be created, analyzed, and/or delivered over any network, such as a mobile network, a cable television network, a satellite network, or a device network.

Figure 1:
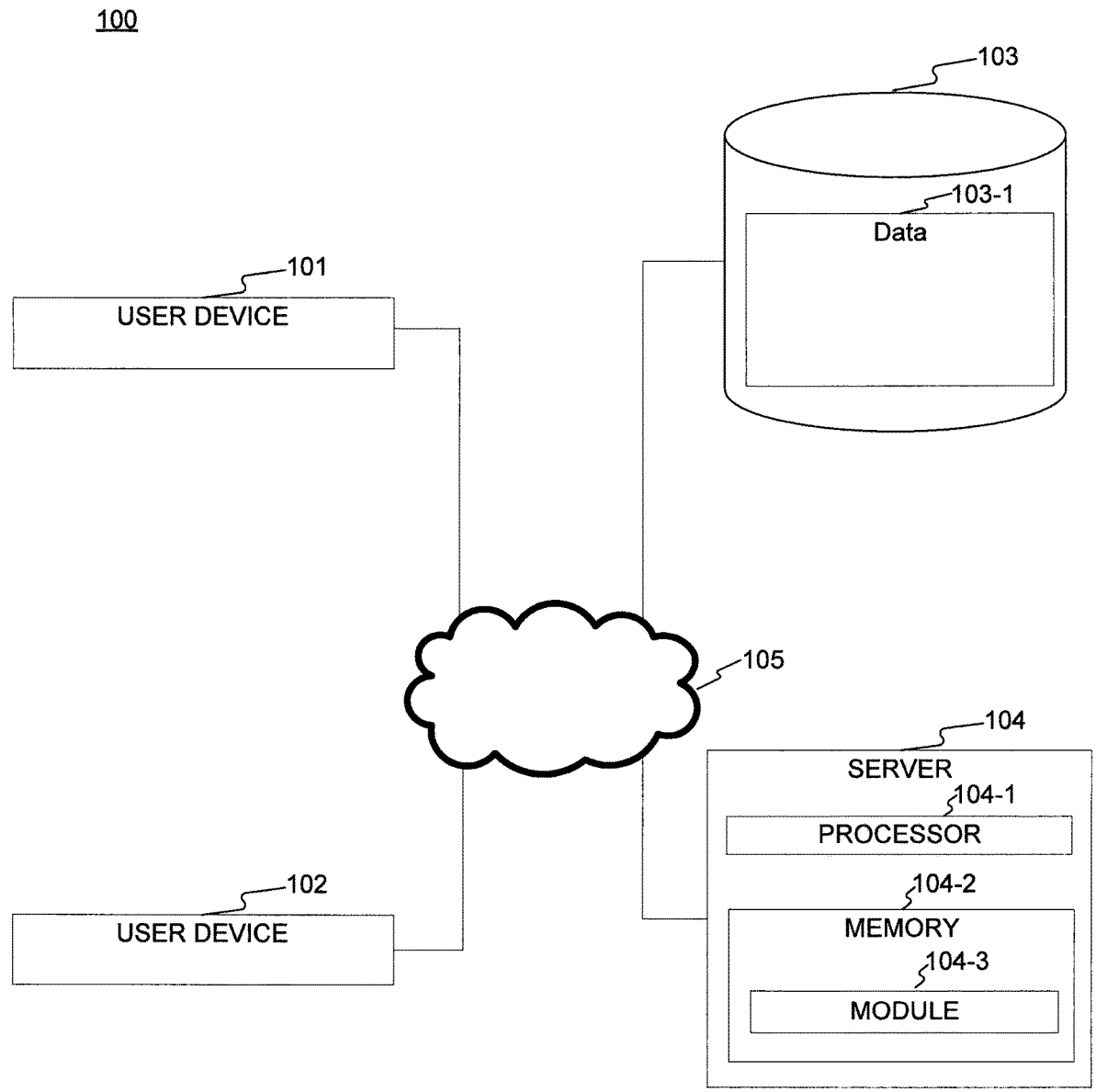
FIG. 1 depicts an exemplary system environment for practicing embodiments consistent with the present disclosure.

FIG. 1 illustrates an exemplary system environment 100, consistent with the disclosed embodiments. As further disclosed herein, environment 100 may be used to perform various functions and methods for identifying and managing content, consistent with the present disclosure. The methods or processes performed in or with environment 100 may improve Internet users' online experiences, increase the amount and quality of relevant online content, and/or maximize network web traffic and advertising revenue.

As shown FIG. 1, environment 100 may include one or more servers 104, one or more user devices 101 and 102, and/or one or more databases 103. As further shown in the drawing, the components of FIG. 1 may communicate with one another via an electronic network 105, such as the Internet. In one embodiment, electronic network 105 comprises a collection of networks, such as wired and/or wireless networks.

Server 104 may be implemented with one or more computing systems and be associated with an entity that delivers or otherwise makes electronic content and/or advertisements available over electronic network 105. For example, server 104 may be associated with an electronic content provider, an electronic advertisement provider, a search engine, an Internet Service Provider (ISP), a mobile service provider, an online retailer, or any other entity concerned with distributing electronic content and/or advertisements over electronic network 105. In one embodiment, the server 104 may provide one or more content web pages, like AOL®, Google®, a news company (e.g., The Washington Post®, CNN®, Fox News®), a blog site, a social networking site, or any other company that attracts the web traffic of users devices 101 and 102 to view content on its web pages.

Moreover, server 104 may include one of more processors 104-1. Processor 104-1 may include one or more hardware computer microprocessors for processing data according to a set of programmable instructions or a software modules 104-3 stored in memory 104-2 to perform the disclosed processes of sever 104. The functions of each processor may be provided by a single dedicated processor or by a plurality of processors. In addition, each processor may be a general-purpose processor or a special-purpose microprocessor configured to perform the disclosed functions of server 104.

Memory 104-2 may include any type of random-access memory (RAM) or read-only memory (ROM) embodied in a physical computer-readable storage medium. Memory 104-2 may contain computer program instructions which, when executed by processor 104-1, cause the processor to perform the disclosed processes of server 104.

In one embodiment, server 104 may include one or more servers or modules for organizing a website (not shown). The modules may use data 103-1 stored in one or more databases 103 to organize the website structure. Database 103 may communication with server 104 over electronic network 105, or may be directly connected to or located within server 104. Data 103-01 may be distributed across multiple databases 103. The data 103-01 may include content that server 104 includes in a website that is provided to user device 101 or user device 102. The data 103-01 may also include user demographic information, user interest information, geographical information, and/or information relevant to personalizing a webpage.

Server 104 may control the display of electronic content at desired times to desired user devices 101 and 102 on desired web pages so as to maximize user experiences and/or advertising revenue. For example, topics of the webpage may be selectively matched in real-time based on the identify of a user of device 101 or 102, a website/link/content requested by the user, time of day, geographic location, web history, preferences, and/or other information. Server 104, and/or one or more ad servers (not shown) may serve ads based on contextual targeting of websites, search results, advertiser information and/or user profile information. Such ad servers or server 104 may be configured to generate behavioral logs, leadback logs, click logs, action logs, conversion logs, and/or impression logs, based on users' interactions with websites and/or ads which may be later used to determine a set of topics to include in the webpage.

User devices 101 and 102 may include a desktop computer, laptop computer, personal digital assistant ("PDA"), smartphone, mobile device, Internet-enabled television, automobile, or home, or any other mobile or electronic device configured to access the electronic network 105. User devices 101 and 102, or their users, may or may not have an existing relationship to server 104. Thus, the term "user" may refer to, for example, any consumer, viewer, or visitor of a web page or website, and can also refer to the aggregation of individual users into certain groupings. References to users "viewing" content and/or ads is meant to include any presentation, whether visual, aural, tactile, or a combination thereof. In another embodiment, users may be a subset of Internet users defined by their membership in a network associated with server 104. For example, users may be provided with a username and password by which they may log-in to a network website. The network may retain a set of attributes associated with each user, in a searchable profile. The attributes may reflect the user's interests and incorporate characteristics that impact content and advertisement selection, purchasing, and/or other online behavior. Attributes may be created based on user data, such as impression history, click history, purchase history, demographic data, submission history, preferences, etc., any of which may be user-supplied.

System 100 may further include one or more search engine systems (not shown). Search engine may include one or more server computers configured to parse or crawl textual data of content web pages on electronic network 105, to index and store the textual data, and/or to search the indexed textual data based upon requests from users. In some embodiments, search engine systems may be stand-alone search engines providing a home page with a "query bar" into which users 106 may type a keyword query, like AOL®, Google®, or Yahoo®. Upon receipt of a keyword query, search engine systems may search through the stored indices for web pages on electronic network 105 that include, reference, and/or are tagged by the query keyword (i.e., so-called "hits"). In other embodiments, search engine systems may include search engines integrated with certain websites, such as news sites, social networking sites, or a blog sites. In such an embodiment, the search engines may parse, index, and search only web pages of the particular website with which the search engines are associated. Regardless of their embodiments or implementations, search engine systems may also employ conventional ranking and relevancy algorithms to determine which web page results will be most relevant to the query keyword entered by users, and may return search results as a list of hits, including a Uniform Resource Locator (URL) link directing users to each web page hit, in a sequence based on relevancy.

Search engine systems may maintain and store search results history, for example, in an associated memory or data storage device. When a user provides a keyword query to a search engine system, it may update the search results history with an entry containing information regarding the query, as well as the search results returned to the user. The search engine system may supply user selection information, along with information identifying the user or characteristics of a user, for storage in database 103.

System 100 may further include one or more content collection systems (not shown). Content collection systems may collect and store digital content—such as articles, blog entries, photos, videos, etc—for storage in a database, such as database 103. Content collection systems may collect the content by scraping or crawling electronic network 105, as discussed above, or by receiving data from one or more feeds (e.g., the Associated Press® news feed or Twitter®).

Figure 2:
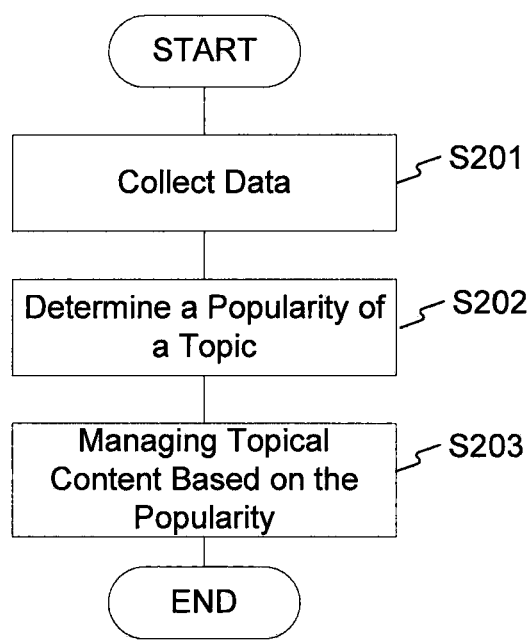
FIG. 2 depicts a flowchart of an exemplary process for practicing embodiments consistent with the present disclosure.

FIG. 2 illustrates a flowchart of an exemplary process, consistent with embodiments of the present disclosure. The exemplary process of FIG. 2 may be implemented for automatically identifying and managing topical content. In step S201, one or more devices may collect electronic data, such as electronic content. The one or more devices may include server 104, user devices 101 or 102, and/or any other device capable of processing electronic data. The collected data may include news, articles, blog entries, social media data, emails, Twitter® entries, or the like. The one or more devices may collect the electronic data by one or more of scraping, crawling a network, subscribing to one or more data feeds, data logging, etc. The collected data may include one or more tags, keywords, categories, or other information from which a topic can be determined. The one or more devices may store the collected data, and/or any associated tags, keywords, categories, or other metadata, in database 102.

In step S202, a device, such as server 104, may determine a popularity of one or more topics. A topic popularity may be determined based on one or more factors, such as time, location, attributes or user device 101 and/or 102, or attributes of users of device 101 and/or 102. In one embodiment, a device may determine topic popularity by determining a topic of one or more pieces of the collected data. The device may further determine topic popularity by maintaining a count of each topic found in the collected data. One manner for determining the count may include running one or more queries on the collected data. For example, in one embodiment, a search engine for network 105 may receive a query relating to one or more topics or keywords, and the number of results returned may be used to determine a topic popularity.

Figure 3:
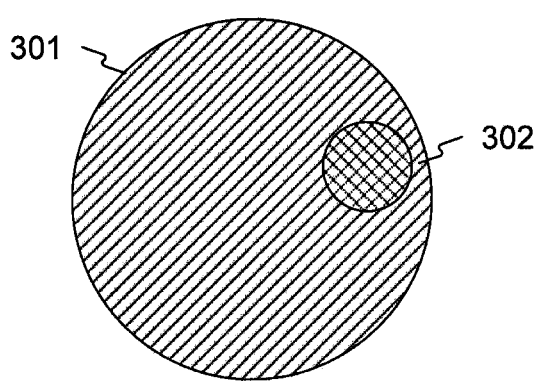
FIG. 3 depicts an exemplary relationship between two levels of popularity.

Topic popularity may be determined based on different attributes. In one embodiment, the attributes may be at different levels of popularity. For example, FIG. 3 depicts attributes having two levels of popularity, a higher level of popularity 301 and a lower level of popularity 302. While FIG. 3 depicts two levels of popularity, three or more levels of popularity may be used. For example, popularity may be determined based on a geographic context, an entity context, and/or a temporal context.

In a geographic context, the higher level of popularity 301 may be a specific country or region of the world, and the lower level of popularity 302 may be a state, county, city, or town within the specific country or region of the world. In an entity context, the higher level of popularity 301 may be a university or company, and the lower level or popularity 302 may be a college or division within the university or company. In a temporal context, the higher level of popularity 301 may be a month or year, and the lower level of popularity 302 may be a day or week within the month or year.

Figure 4:
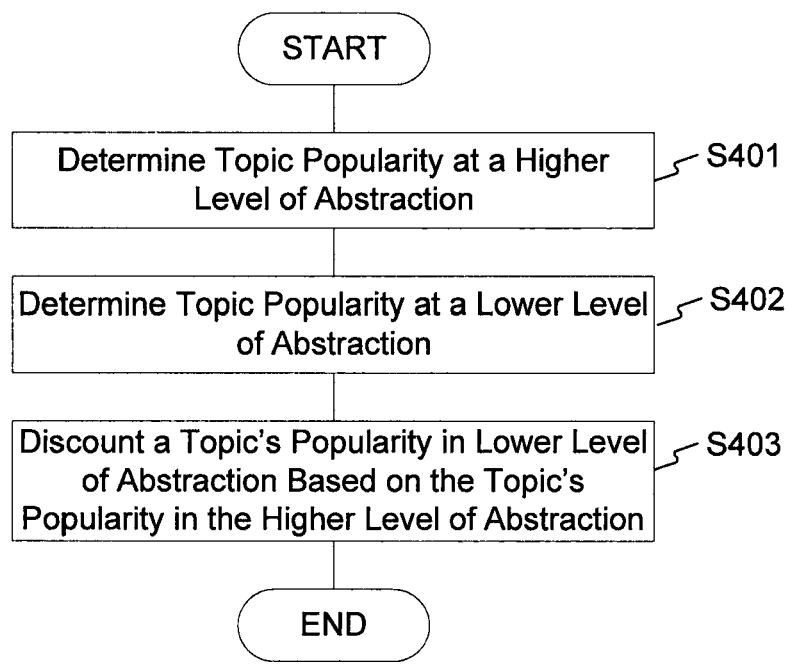
FIG. 4 depicts a flowchart of an exemplary process for determining a topic popularity, consistent with embodiments of the present disclosure.

FIG. 4 depicts a flowchart of an exemplary process consistent embodiments of the present disclosure. The exemplary process of FIG. 4 may be implemented to determine a topic's popularity at the lower level of popularity 302. First, in step S401, one or more devices, such as server 104, determine a popularity of one or more topics at the higher level of popularity 301. As discussed above, the popularities may be determined based on one or more of the attributes or contexts indicated above. The popularities may also be determined based on one or more statistics captured by server 104, the search engine, or one or more other devices that monitor activity on electronic network 105. For example, popularity of a topic may be based, at least in part, on the number of times a user related to popularity level 301 and/or 302 selects an article for a particular topic.

In step S402, one or more devices, such as server 104, may determine a topic's popularity at the lower level of popularity 302. This may be achieved in a similar manner to determining the popularity at the higher level of popularity, as discussed above. Then, in step S403, the one or more devices may discount a topic's popularity at the lower level of popularity. This may be achieved by using, for example, an algorithm based on KL divergence, the Bayes probability theorem, or statistical modeling. As an example, Barak Obama may be very prevalent in new articles across the United States during the election, so he may not be identified as a topic that is specifically popular in a particular small town or city in the United States. However, if a topic pertaining to a particular issue is prevalent in the small town or city, but not the United States in general, that topic, even if the articles mention Barak Obama, may still be included in the identified topics. As another example, Osama bin Laden may be written about a lot globally (e.g., mentioned in 50% of articles). In San Francisco, he may also been written about a lot as well, but this is not specific to San Francisco. For example, in San Francisco, Osama may be mentioned in 45% of articles. In contrast, Barry Bonds may be mentioned in 30% of San Francisco articles, but he may only be mentioned in 1% of articles globally. Accordingly, Osama would be discounted so that Barry Bonds is determined to be a more popular topic in San Francisco.

Returning to FIG. 2, once the topics and topic popularities are determined, the one or more devices, such as server 104, may be used to manage topical content for website(s). Managing topical content may include controlling the presentation of one or more pieces of topical content on a website, by selecting content to be displayed, a location at which to display topical content, generation of one or more content areas in which to display the topical content, and/or determining when or to whom the topical content will be displayed based on, for example, the determined popularity of the content. Managing topical content may also include generating or updating a navigational structure and/or taxonomy of a website. In one embodiment, generating or updating a navigational structure may include generating or updating one or more content, linking, or menu areas, such as on a webpage. Generating or updating a navigational structure may further include generating or updating one or more menus, such as a menu bar, a dropdown menu, a popup menu, etc. of a website. Embodiments for generating or updating a taxonomy of a website may be implemented using similar techniques.

Consistent with one embodiment, FIG. 5A depicts an exemplary element 500-A for including in a webpage. Element 500-A may be, for example, associated with a topical news area on a webpage. As shown in FIG. 5A, exemplary element 500-A is an element that includes one or more topics 502-A that are determined to be popular for the local area of a user of user device 101 or 102. By way of example, in a small farming town of the user, people may be particularly concerned with a politician's positions on farm grants, Emma Thompson may have just been elected mayor, and the local factory may have been in the news due to possible layoffs. One or more devices, such as server 104, may determine to display element 500-A in response to data received about the user's locality. This information may be received based on one or more pieces of information entered by a user, an identifier used to access the webpage, the user device 101 or 102 used to access the webpage, GPS coordinates, an IP address of user device 101 or 102, a user profile, etc. Instead of, or in conjunction with, displaying the topics, one or more pieces of the electronic content, or a portion thereof, may be presented in element 500-A. Element 500-A may also include a heading 501-A, indicating its level of popularity, such a "LOCAL" or a name associated with the level of popularity (e.g., a town name, the name of a group or organization, etc.). In one embodiment, an element pertaining to the higher level or popularity may also be displayed. In another embodiment, one or more content areas for the topics may be generated for individual ones of the topics. The content areas for the individual areas may include one or more pieces of electronic content pertaining to the topic associated with the content area. The topics 502-A may be hyperlinks or other elements that allow interaction with a user and access to relevant information. For example, a user may interact with topics 502-A by mousing-over, clicking, touching, speaking the name of, scrolling to, or otherwise indicating a desire to select a particular topic. Based on the user interaction, the user may navigate to one or more windows or pages of content relating to the identified topics. These one or more pages may be created based on the identification of popular topics as discussed above. For example, the identification of a popular topic may cause a taxonomy of a website to include one or more content pages for the identified topics. The pages may be pre-generated, static pages or be dynamically generated. For example, the may be generated based on running one or more database queries or by retrieving data from one or more data feeds.

Once a page is generated, the page may be cached, such that the page may be retrieved for some predetermined amount of time without have to rerun the one or more database queries or reparse the data feed for information. The one or more database quires or data feeds may be predetermined or generated based on the topics determined above.

Content may be stored in a database along with an indication of one or more topic to which it relates. Accordingly, populating the website may include query the database for content pertaining to a particular topic. The database may also store other information pertaining to the content that may be used in the query, such as the data on which the content was created or published, the number of times the content has been accessed, a rate by which the content is accessed, etc. Accordingly, populating the website may include retrieving current and/or popular content.

In response to determining a topic, one or more data feeds may be generated based on the topic. The data feeds may include the content or identifiers of content that is collected for the determined topic. The data feeds may be, for example, an XML data feed, such as an RSS data feed. The data feeds may be generated, for example, by running one or more queries, scraping content, or receiving content submissions.

FIG. 5B depicts another exemplary element 500-B, consistent with an embodiment of the present disclosure. Element 500-B may be, for example, a topical content area for including in a webpage. In element 500-B, the topic of the content area may be indicated, such as by heading 501-B (e.g., "Farm Grants"). In element 500-B, content having the topic identified by heading 501-B may be included, such as articles 502-B. The content having the topic may also include, for example, one or more videos, audio files, text files, and/or pictures. For example, one or more thumbnail images corresponding to articles 502-B. The articles 502-B may include hyperlinks or other elements that allow interaction with a user and access to relevant content or information. In addition, element 500-B may be generated based on running on or more queries or reading a data feed, as discussed above.

Figure 5C:
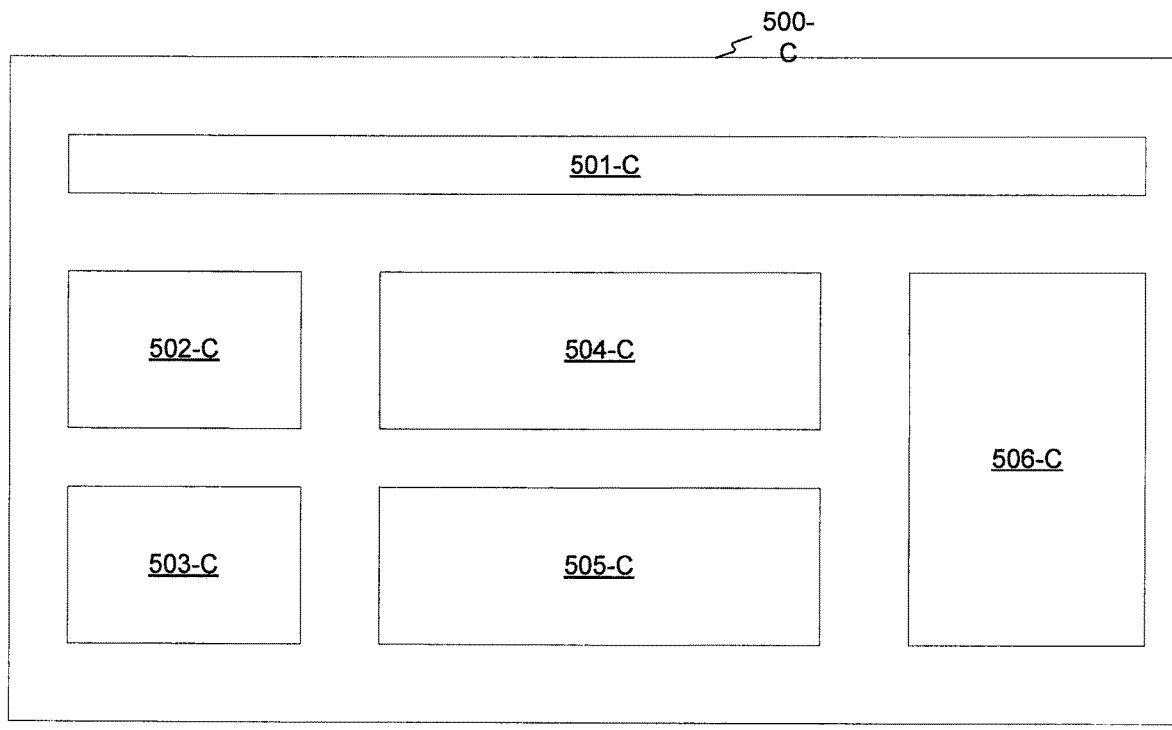
FIG. 5C depicts an exemplary layout of a webpage of a website, consistent with an embodiment of the present disclosure.

FIG. 5C depicts an exemplary layout of a webpage 500-C of a website, consistent with an embodiment of the present disclosure. The webpage 500-C may include one or more elements, such as elements 501-C to 506-C. Elements 501-C to 506-C may include one or more navigational elements, such as a menu, hyperlinks, etc. Elements 501-C to 506-C may include one or more advertising elements, such as an image advertisement, a video advertisement, an interactive advertisement, etc. Elements 501-C to 506-C may include one or more content areas for displaying content, such as textual content, audio and/or video content, etc. —including, for example one or more new articles. Elements 501-C to 506-C may include elements 500-A and/or 500-B, as discussed above. Consistent with some embodiments, interacting with topics 502-A or articles 502-B may cause a new webpage or window to be loaded or one or more of elements 501-C to 506-C to present content to a user.

One or more devices, such as web server 104, may dynamically or pre-generate elements 501-C to 506-C based on the determined topics and/or the content collected for the determined topics.

Figure 5D:
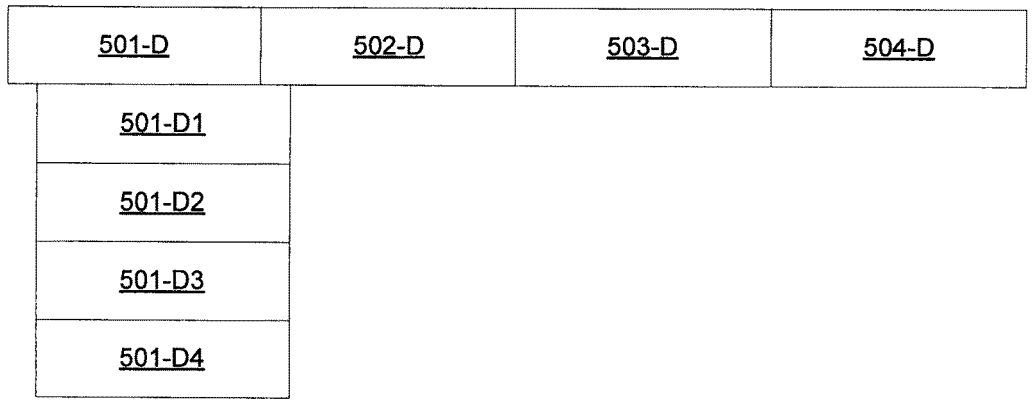
FIG. 5D depicts an exemplary menu, consistent with an embodiment of the present disclosure.

FIG. 5D depicts an exemplary menu 500-D for a website, consistent with the present disclosure. Menu 500-D may include one or elements 501-D to 504-D. Menu 500-D may also include one or more sub-elements 501-D1 to 501-D4. Menu 500-D may be updated based on the determination of topics. For example, elements 501-D to 504-D and/or sub-elements 501-D1 to 501-D4 may be updated based on the determined topics. For example, elements 501-D to 504-D and/or sub-elements 501-D1 to 501-D4 may be updated to present the determined topics. User interactions with elements 501-D to 504-D and/or sub-elements 501-D1 to 501-D4 may further cause a webpage or window relating to a topic to be displayed, or one of elements 501-C to 506-C to be updated to present content relating to a selected topic.

One or more devices, such as web server 104, may dynamically or pre-generate elements 501-D to 504-D and/or sub-elements 501-D1 to 501-D4 based on the determined topics and/or the content collected for the determined topics. As will be appreciated, the arrangement and number of elements in depicted in FIG. 5D is exemplary and other arrangements and numbers of elements can be used, consistent with the teachings of the present disclosure.

Consistent with one embodiment, one or more devices, such as server 104, may use the identified topics to generate or update a taxonomy for a website. For example, one or more devices, such as server 104, may dynamically generate one or more sub-sections based on the identified topics or topical content. This may be achieved by issuing one or more queries upon receiving a request for a webpage. The website structure may also be updated by manipulating one or more documents defining a website structure based on the determined topics. For example, FIG. 5E depicts and exemplary document 500-E defining a website structure. The structure defined in document 500-E may be updated to reflect the determined topics. In one embodiment, the navigational structure or taxonomy of the website may be updated based on a combination of updating document 500-E and issuing dynamic queries upon receiving a request for a webpage. This may be achieved by first retrieving all relevant all relevant documents for a give topic (e.g., San Francisco News). For a given result set, after applying relative entropy or discounting, a set of subjects and/or people that are popular may be determined, and each member of the set may have a lot of news associated with it. Accordingly, a position in the navigational structure may be created for every item in the set.

Figure 6:
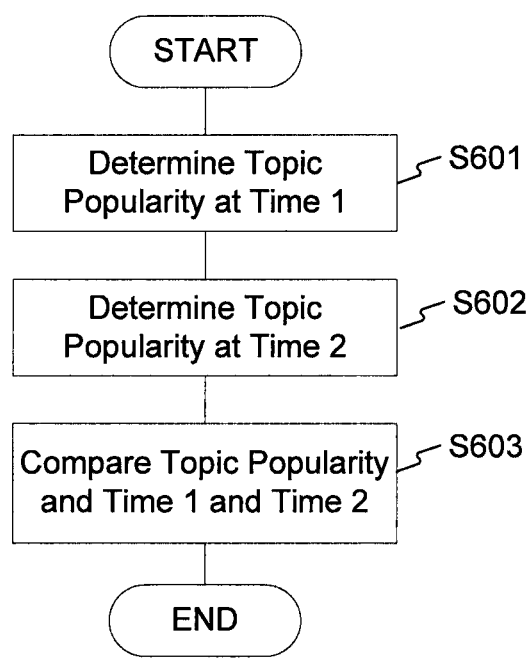
FIG. 6 depicts a flowchart of an exemplary process for determining a breaking topic, consistent with an embodiment of the present disclosure.

Consistent with additional embodiments of the present disclosure, FIG. 6 depicts a flowchart of an exemplary process for determining breaking news or content. The breaking news may be displayed in a breaking news area of the webpage, or in a breaking news area for one of the levels of popularity 301 and 302. In step S601, one or more devices may determine the topics for a level of popularity 301 and 302 at a first time period. In step S602, the one or more devices may determine the topics for the level of popularity 301 and 302 at a second time period. In step S603, the topics during the first time period and the second time period are compared to determine one or more breaking topics. For example, this may be achieved by applying relative entropy against two different time periods to determine what topics are new and interesting. For example, in San Francisco the determined popular topics may have included major topics in months 1-4. However, in month 5, when the query is rerun, the topic fashion may become more prominent than in the past. This may cause, for example, "fashion" to be deemed a breaking topic. Over time, "fashion" may become a major topic or it may disappear from popularity.

One skilled in the art will appreciate that computer programs for implementing the disclosed methods may be stored on and/or read from computer-readable storage media. The computer-readable storage media may have stored thereon computer-executable instructions which, when executed by a computer, such as server 104, cause the computer to perform, among other things, the processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. Computer-readable storage media are distinct from computer-readable transmission media (i.e., transitory signals). The computer-readable storage media may be embodied by or in one or more components of environment 100.

One skilled in the art will further realize that the processes illustrated in this description may be implemented in a variety of ways and may include multiple other modules, programs, applications, scripts, processes, threads, or code sections that may all functionally interrelate to accomplish the individual tasks described above. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose. In addition, the disclosure may be implemented in a variety of different data communication network environments and may use software, hardware, or a combination of hardware and software to provide the disclosed functions.

The many features and advantages of the present disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for providing topical content on a website for users, the method comprising the following operations performed by one or more processors:

retaining, in a database, attributes of a plurality of users, wherein the attributes comprise at least one of: an impression history, a purchase history, a conversion history, and/or user preferences;

associating a plurality of users with a plurality of factors including the attributes;

associating collected electronic content with a plurality of topics;

determining levels of popularity corresponding to combinations of the factors and the topics based on the factors including the attributes, wherein the levels of popularity include a higher level and a lower level;

receiving, from a device of a first user, a content request associated with a first one of the factors;

parsing one or more websites for content associated with the request;

caching the one or more parsed websites;

determining, based on the popularity of the topics in the higher level, one or more discounted levels of popularity corresponding to the popularity of the topics in the lower level and the first one of the factors;

managing the topical content based on the one or more discounted levels of popularity for the first one of the factors and further generating one or more content areas in which to display the topical content; and generating instructions to present, on the website, one or more pieces of the managed topical content in the generated one or more content areas;

wherein managing the topical content comprises updating one or more navigational menus and links of the website based on the discounted levels of popularity for the first ones of the factors, and wherein generating the instructions includes generating instructions to update the one or more navigational menus and links of the website.

2. The computer-implemented method of claim 1, wherein determining levels of popularity comprises:

receiving, from the plurality of users, selections of content from the collected electronic content; and determining the levels of popularity, for combinations of the topics and the factors, based on the numbers of times users associated with the factors selected content associated with the topics.

3. The computer-implemented method of claim 1, wherein determining discounted levels of popularity comprises:

identifying a second one of the factors; and calculating the discounted levels of popularity based on (i) the levels of popularity corresponding to the combination of the topics and the first one of the factors, and (ii) the levels of popularity corresponding to the combination of the topics and the second one of the factors.

4. The computer-implemented method of claim 3, wherein the second one of the factors encompasses the first one of the factors.

5. The computer-implemented method of claim 3, wherein at least one of the first one of the factors and the second ones of the factors is time.

6. The computer-implemented method of claim 3, wherein determining the discounted levels of popularity comprises calculating the discounted levels of popularity using at least one of a KL divergence or Bayes probability theorem.

7. The computer-implemented method of claim 1, wherein generating one or more content areas in which to display the topical content further comprises dynamically generating one or more content areas on the website.

8. The computer-implemented method of claim 1, wherein generating one or more content areas in which to display the topical content further comprises dynamically generating one or more subsections of the website.

9. The computer-implemented method of claim 1, wherein updating the one or more navigational menus and links of the website further comprises dynamically updating a taxonomy of the website.

10. The computer-implemented method of claim 1, wherein the factors comprise one or more of an IP address, or location-based attributes associated with the users.

11. A system for presenting topical content on a website for users, the system comprising:

at least one processor; and a storage device storing a set of instructions, that when executed by the at least one processor, causes the at least one processor to:

retain, in a database, attributes of a plurality of users, wherein the attributes comprise at least one of: an impression history, a purchase history, a conversion history, and/or user preferences;

associate a plurality of users with a plurality of factors including the attributes;

associate collected electronic content with a plurality of topics;

determine levels of popularity corresponding to combinations of the factors and the topics based on the factors including the attributes, wherein the levels of popularity include a higher level and a lower level;

receive, from a device of a first user, a content request associated with a first one of the factors;

parsing one or more websites for content associated with the request;

caching the one or more parsed websites;

determine, based on the popularity of the topics in the higher level, discounted levels of popularity corresponding to the popularity of the topics in the lower level and the first one of the factors;

manage the topical content based on the discounted levels of popularity for the first one of the factors and further generate one or more content areas in which to display the topical content; and generate instructions to present, on the website, one or more pieces of the managed topical content in the generated one or more content areas;

wherein managing the topical content comprises updating one or more navigational menus and links of the website based on the discounted levels of popularity for the first ones of the factors, and wherein generating the instructions includes generating instructions to update the one or more navigational menus and links of the website.

12. The system of claim 11, wherein the instructions are further executed by the at least one processor to:

receive, from the plurality of users, selections of content from the collected electronic content; and determine the levels of popularity, for combinations of the topics and the factors, based on the numbers of times users associated with the factors selected content associated with the topics.

13. The system of claim 11, wherein the instructions are further executed by the at least one processor to:

determine a second one of the factors; and calculate the discounted levels of popularity for the topics based on (i) the levels of popularity corresponding to the combination of the topics and the first one of the factors, and (ii) the levels of popularity corresponding to the combination of the topics and the second one of the factors.

14. The system of claim 13, wherein the second one of the factors encompasses the first one of the factors.

15. The system of claim 13, wherein at least one of the first one of the factors and the second one of the factors is time.

16. The system of claim 13, wherein the instructions are further executed by the at least one processor to calculate the discounted levels of popularity using at least one of a KL divergence or Bayes probability theorem.

17. The system of claim 11, wherein generating one or more content areas in which to display the topical content further comprises dynamically generating one or more content areas on the website.

18. The system of claim 11, wherein generating one or more content areas in which to display the topical content further comprises dynamically generating one or more subsections of the website.

19. The system of claim 11, wherein the one or more navigational menus and links of the website further comprises dynamically updating a taxonomy of the website.

20. The system of claim 11, wherein the factors comprise one or more of an IP address, or one or more location-based attributes associated with the users.

21. A non-transitory computer-readable storage medium storing a set of instructions executable by a processor to perform a method for presenting topical content on a website for users, the method comprising:

retaining, in a database, attributes of a plurality of users, wherein the attributes comprise at least one of: an impression history, a purchase history, a conversion history, and/or user preferences;

associating a plurality of users with a plurality of factors including the attributes;

associating collected electronic content with a plurality of topics;

determining levels of popularity corresponding to combinations of the factors and the topics based on the factors including the attributes, wherein the levels of popularity include a higher level and a lower level;

receiving, from a device of a first user, a content request associated with a first one of the factors;

parsing one or more websites for content associated with the request;

caching the one or more parsed websites;

determining, based on the popularity of the topics in the higher level, one or more discounted levels of popularity corresponding to the popularity of the topics in the lower level and the first one of the factors;

managing the topical content based on the one or more discounted levels of popularity for the first one of the factors and further generating one or more content areas in which to display the topical content; and generating instructions to present, on the website, one or more pieces of the managed topical content in the generated one or more content areas;

wherein managing the topical content comprises updating one or more navigational menus and links of the website based on the discounted levels of popularity for the first ones of the factors, and wherein generating the instructions includes generating instructions to update the one or more navigational menus and links of the website.

* * * * *